United States Patent

[11] 3,559,668

[72] Inventor Richard L. Crossman, Tallmadge, Ohio
[21] Appl. No. 804,167
[22] Filed Mar. 4, 1969
[45] Patented Feb. 2, 1971
[73] Assignee The Goodyear Tire & Rubber Company, Akron, Ohio, a corporation of Ohio

[54] SAFETY VALVE

5 Claims, 5 Drawing Figs.

[52] U.S. Cl. 137/73, 301/5
[51] Int. Cl. F16k 17/38
[50] Field of Search 137/72—77; 122/504.1, 504.3; 220/89A, 89B; 301/5, 6, 2, 200, 500+

[56] References Cited

UNITED STATES PATENTS

| | | | |
|---|---|---|---|
| 1,151,764 | 8/1915 | Dodson | 220/89-B |
| 2,242,798 | 5/1941 | Miller | 122/504.3 |
| 2,353,254 | 7/1944 | McCandless | 220/89-A |
| 3,138,406 | 6/1964 | Chamberlain | 122/504.3X |
| 3,200,987 | 8/1965 | Horner | 220/89-B |

FOREIGN PATENTS

| | | | |
|---|---|---|---|
| 602,561 | 5/1948 | Great Britain | 122/504.3 |

*Primary Examiner*—William F. O'Dea
*Assistant Examiner*—Richard Gerard
*Attorneys*—F. W. Brunner and Paul E. Milliken

ABSTRACT: A safety valve for use on a tire or other pressure chamber to release internal pressure in the event of excessive pressure or temperature within the chamber. The present embodiments show a cylindrical hollow housing threaded into a wheel rim. A cylindrical sleeve of eutectic material is positioned in the center bore of the housing and carries a ball or disc which retains the pressure within a tire mounted on the wheel. When the pressure or temperature of the tire reaches a certain predetermined safe maximum, the eutectic sleeve will either melt and release the pressure retaining ball or disc, or due to the softness of the sleeve, will permit the ball or disc to be forced outwardly from the sleeve when the internal pressure reaches a certain predetermined maximum.

INVENTOR.
RICHARD L. CROSSMAN
BY
[signature]
ATTORNEY

SAFETY VALVE

This invention relates to a safety valve for use on a tire or other pressure chamber to release internal pressure in the event of excessive pressure or temperature within the chamber.

PRIOR ART

It is well known in the prior art to use eutectic or fusible materials in safety valves or fuse plugs in boilers, aircraft wheels and other pressure chambers which are subjected to high-pressure and temperature. The closest prior art known to applicant are U.S. Pat. No. 1,151,764 issued to J. T. Dodson, U.S. Pat. No. 1,237,957 issued to W. F. Ray et al., and U.S. Pat. No. 3,138,406 issued to R. K. Chamberlain. The Ray et al. Pat. shows a commonly used fusible boiler plug having a conical shaped center plug of fusible material which melts away when the boiler temperature reaches a certain predetermined maximum. One of the difficulties encountered with this type of plug is that the conical center plug will melt first around its periphery and will tend to work its way axially outwardly without actually releasing the internal pressure until substantially the entire center plug has melted away. This does not always provide a sufficiently rapid release of the internal pressure to prevent an explosion. This is a typical problem encountered with any fusible plug in which the entire plug must melt substantially away before the pressure is released. Many of the prior art safety plugs or valves, in order to remedy this situation, have become more complicated with a number of moving parts which add to the expense and complexity of the valve and provide more parts which may fail to function when operation of the valve is needed to release the pressure.

OBJECTS OF THE INVENTION

It is a primary object of this invention to provide a safety pressure release valve which will operate rapidly and positively when subjected to a predetermined maximum temperature or pressure.

Another object of this invention is to provide a valve which has a minimum number of working parts and which is inexpensive to produce.

A still further object of this invention is to provide a valve in which the original housing may be reused over and over again after operation of the valve by merely replacing a center portion of the valve.

These and other objects of the invention will become more fully apparent as the description proceeds in the following specification and the accompanying drawings.

DESCRIPTION OF THE PREFERRED EMBODIMENTS

Figure 1:
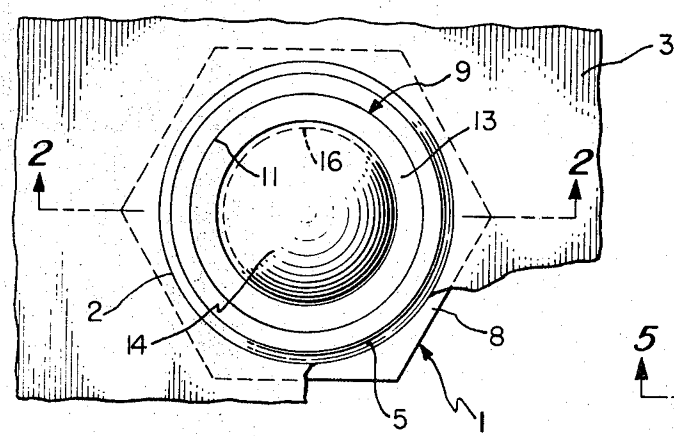
FIG. 1 is an end view of the inner end of the valve of the invention fastened to a wheel rim which carries a pneumatic tire.
Figure 2:
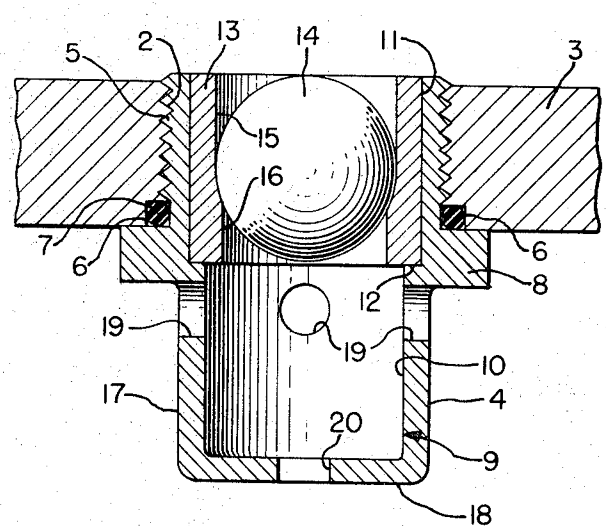
FIG. 2 is a cross-sectional view taken on line 2–2 of FIG. 1.

Referring now to FIGS. 1 and 2, the valve indicated generally by the numeral 1 is screwed into a threaded opening 2 in a wheel rim 3. The valve 1 has a cylindrical housing 4 having external threads 5 on the axially inner end portion thereof which engage the threaded opening 2. An annular groove 6 surrounds the opening 2 on the outer surface of the wheel rim 3 and receives an O-ring 7 which provides an airtight seal between the wheel rim 3 and the valve 1. A hexagonal integral collar 8 surrounds the housing 4 and provides a means for tightening the valve 1 with a wrench and at the same time, provides a surface which compresses the O-ring 7 in the groove 6 and thereby creates a seal. The housing 4 is provided with a center bore 9 having a smaller diameter portion 10 at the outer end of the housing 4 and a larger diameter portion 11 at the axially inner end thereof. The differences in diameter of the center bore 9 creates an annular offset or ledge 12 near the axial center of the housing 4 which serves to position a cylindrical sleeve 13 made of fusible or eutectic material within the bore 9 and prevents the sleeve 13 from moving axially outwardly beyond the ledge 12 when the valve 1 is subjected to internal pressure from the tire. In assembling the valve 1, after the sleeve 13 has been positioned within the larger diameter portion 11 of the center bore 9, a hard metal ball 14, preferably made of steel, having a diameter slightly larger than the inside diameter of the sleeve 13 is forced under pressure into the sleeve 13 to coin the sleeve into the larger diameter 11 of the center bore 9. The physical properties of the material from which the sleeve 13 is made will determine the amount of pressure required to force the ball 14 into the center opening 15 of the sleeve 13 and will also determine how much internal pressure the valve will withstand before the ball 14 is released by the sleeve 13 to move axially outwardly and relieve the internal pressure of the tire. The physical properties of the sleeve 13 will also determine what temperature must be attained by the wheel 3 before the ball 14 will be released by melting of the sleeve 13. The present valve is quicker and more positive acting once the maximum temperature has been reached since there is less eutectic material to melt away than there is in the usual solid conical plug which is used in the prior art devices. Referring now to FIG. 2, it may be seen that the portion 15 of the center opening through which the ball has been forced has increased sufficiently in diameter to permit passage of the ball and remains at the slightly larger diameter while the portion 16 through which the ball has not passed remains at a diameter slightly smaller than the ball and serves to hold the ball in position within the sleeve 13 and prevent it from moving axially outwardly until the internal pressure within the tire has reached a certain predetermined maximum. When the tire reaches the predetermined maximum pressure or temperature, the ball 14 is forced axially outwardly through the sleeve 13 into the outer end portion 17 of the housing 4. The outer end portion 17 has an end wall 18 which retains the ball 14 therein while permitting pressure to escape through ports 19 in the sidewall of the housing 4 and the port 20 in the end wall of the housing 4.

Figure 4:
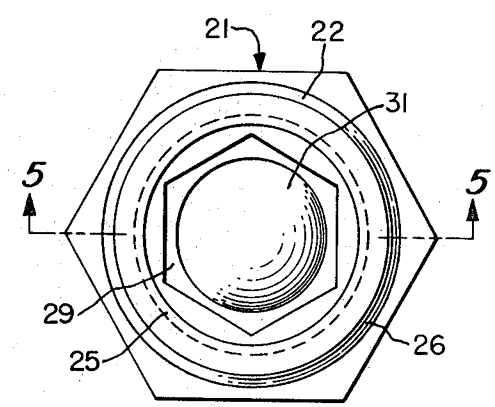
FIG. 4 shows the inner end of a valve illustrating another embodiment of the invention.
Figure 5:
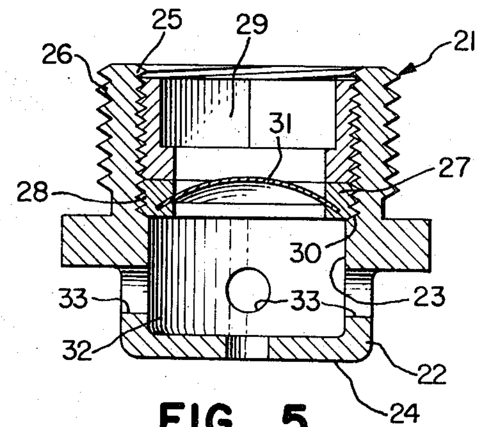
FIG. 5 is a cross-sectional view taken on line 5–5 of FIG. 4.
Figure 3:
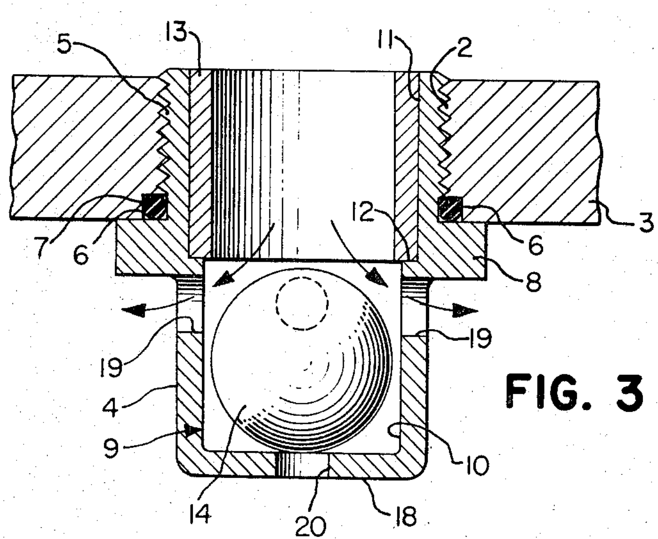
FIG. 3 is a cross-sectional view similar to FIG. 2 but showing the position of the valve after it has operated to release pressure from the tire.

FIGS. 4 and 5 show another embodiment of the invention in which a valve indicated generally by the numeral 21 has a housing 22 similar to the housing 4 but shorter in axial length. The housing 22 has an internal axial bore 23 which is open to the axially outer end thereof inner end of the housing 22 but is closed at the axially inner end of the housing 22 but is closed at the axially outer end thereof by an end wall 24. The housing 22 has internal threads 25 and external threads 26 along an inner end portion of the housing. The external threads 26 engage matching threads in an opening in the wall of a wheel rim, such as the rim 3 shown in FIGS. 1 through 3, or in the wall of any other pressure chamber with which the valve may be used. The internal threads 25 receive an eutectic ring 27 having matching external threads 28 and a retaining rim 29 which is screwed into the internally threaded portion 25 to hold the eutectic ring 27 in position against a ledge 30. The ring 27 has a circular disc 31 cast in place therein and retained by the ring 27 so long as no excessive pressure or temperature is attained in the pressure chamber. When an excessive temperature or pressure is reached, the ring 27 will release the disc 31 either by melting of the ring or by failure of the ring due to the softness of the ring material. As soon as the disc 31 is released by the ring 27, it is driven axially outwardly by the internal pressure into the axially outer end 32 of the housing 22. The end wall 24 prevents the disc 31 from being blown completely out of the housing 22 but permits the pressure to escape through the ports 33 thereby preventing explosion of the pressure chamber. It will be understood that various eutectic alloys or the like may be employed to provide the low melting sleeve 13 used with the valve 1 or the ring 27 used with the valve 21. Various tin lead alloys may be used for this purpose. A more detailed discussion of such materials may be seen in U.S. Pat. No. 3,138,406 issued to R. K. Chamberlain. The type of material used for the eutectic sleeve or ring will depend upon the desired maximum temperature or pressure at which the valve is designed to open. It should be understood that while for the purposes of illustrating the invention the valve is mounted on a wheel rim as a safety valve for a tire, the same concept could be used on any type of pressure chamber. While the preferred embodiment shows a steel ball or ball bearing as the pressure retaining means positioned within the eutectic sleeve 13, it will also be obvious that various other materials and shapes may be used for the pressure retaining means. Various other modifications may be made in the specific examples shown herein without departing from the scope of the invention and mere substitution of materials or contours are also contemplated within the invention.

I claim:

1. A safety valve for a pressure chamber comprising:

A. a housing having an inner end sealingly fastened in a wall opening of a pressure chamber and having an axial center bore in communication with the interior and exterior of the chamber;

B. a eutectic sleeve in the center bore of the housing, said sleeve having a center bore therethrough; and C. a noneutectic pressure retaining ball held within the center bore of said sleeve so long as a predetermined maximum safe pressure and temperature of the pressure vessel is not exceeded but released by the sleeve when the maximum safe temperature or pressure is exceeded;

D. the diameter of the center bore of the eutectic sleeve adjacent the axially inner end being substantially the same as the diameter of the pressure retaining ball and the diameter of the center bore of the sleeve adjacent the axially outer end thereof being smaller than the diameter of the ball to retain the ball in the sleeve so long as normal pressure and temperature is maintained within the pressure chamber;

E. the periphery of the ball sealing directly against the surface of the inner bore of the eutectic sleeve.

2. A safety valve as claimed in claim 1 wherein the housing has an integral closed end portion for retaining the ball in the outer end of the housing after release from the sleeve.

3. A safety valve responsive to excessive heat and pressure for use on pressurized chambers comprising:

A. a housing having:

1. an inner end portion for attachment to a pressure chamber,
2. an outer end portion extending away from the chamber,
3. an axial center bore extending at least part of the axial length of the housing from the inner end thereof, and
4. the outer end portion having at least one pressure escape opening;

B. means sealingly fastening the housing to a wall opening in a pressure chamber;

C. a fusible sleeve located in at least part of the center bore of the housing, said sleeve having a center bore therethrough;

D. nonfusible pressure retaining ball centrally located within the fusible sleeve;

E. said fusible sleeve having a melting point at substantially the maximum safe temperature for the pressure chamber and said sleeve being of sufficiently soft material to release the nonfusible ball when the maximum safe pressure for the chamber is exceeded;

F. the diameter of the center bore of the fusible sleeve adjacent the axially inner end being substantially the same as the diameter of the pressure retaining ball and the diameter of the center bore of the sleeve adjacent the axially outer end thereof being smaller than the diameter of the ball to retain the ball in the sleeve so long as normal pressure and temperature is maintained within the pressure chamber;

G. the periphery of the ball sealing directly against the surface of the inner bore of the fusible sleeve.

4. A safety valve as claimed in claim 3 including means to prevent axial movement of the fusible sleeve in the housing when a safe pressure and temperature is maintained in the pressure chamber.

5. A safety valve as claimed in claim 3 wherein the valve is used as a safety valve on a tire chamber and wherein the valve housing is held by a threaded opening in a wheel rim.